(12) United States Patent  
Khouloud et al.

(10) Patent No.: US 10,947,164 B2  
(45) Date of Patent: Mar. 16, 2021

(54) METHOD FOR MANUFACTURING AN AMMONIUM PHOSPHATE FERTILIZER HAVING LOW CADMIUM CONTENT

(71) Applicant: OCP SA, Casablanca (MA)

(72) Inventors: Mehdi Khouloud, El Jadida (MA); Abdelaali Kossir, Casablanca (MA); Kamal Samrane, Casablanca (MA)

(73) Assignee: OCP SA

( * ) Notice: Subject to any disclaimer, the term of this patent is extended or adjusted under 35 U.S.C. 154(b) by 113 days.

(21) Appl. No.: 15/750,053

(22) PCT Filed: Aug. 3, 2016

(86) PCT No.: PCT/MA2016/000012  
§ 371 (c)(1),  
(2) Date: Feb. 2, 2018

(87) PCT Pub. No.: WO2017/023153  
PCT Pub. Date: Feb. 9, 2017

(65) Prior Publication Data  
US 2018/0222809 A1 Aug. 9, 2018

(30) Foreign Application Priority Data  
Aug. 3, 2015 (FR) ...................... 1557483

(51) Int. Cl.  
*C05B 7/00* (2006.01)  
*C05B 11/00* (2006.01)  
(Continued)

(52) U.S. Cl.  
CPC ............ *C05B 7/00* (2013.01); *C01B 25/28* (2013.01); *C05B 11/00* (2013.01); *C05B 11/08* (2013.01); *C05B 19/00* (2013.01)

(58) Field of Classification Search  
None  
See application file for complete search history.

(56) References Cited

U.S. PATENT DOCUMENTS

| 3,974,262 A | 8/1976 | Crerar et al. |
| 4,017,588 A | 4/1977 | Davidson |

(Continued)

FOREIGN PATENT DOCUMENTS

| DE | 3134847 A1 * | 3/1983 | ............ C01B 25/22 |
| EA | 201691099 A1 | 10/2016 | |

(Continued)

OTHER PUBLICATIONS

French Preliminary Search Report for Application No. 1557483 dated Jun. 13, 2016, pp. 1-8.

(Continued)

*Primary Examiner* — Wayne A Langel  
(74) *Attorney, Agent, or Firm* — Lerner, David, Littenberg, Krumholz & Mentlik, LLP

(57) ABSTRACT

The invention relates to a method for manufacturing an ammonium phosphate fertilizer from a phosphoric acid aqueous solution that has less than 50% $P_2O_5$ concentration and is obtained by wet phosphate ore treatment, said phosphoric acid containing traces of cadmium, comprising the following steps:
(a) neutralizing said phosphoric acid solution (1) with ammonia (3) up to a molar ratio N/P of between 0.1 and 0.8,
(b) reacting said partially neutralized solution (4) with a sulfide source (6) so as to form a cadmium sulfide precipitate (9),
(c) separating said precipitate (9) so as to obtain a refined ammoniated phosphoric acid solution (10),
(d) ammoniating and granulating said refined solution (10) so as to form said fertilizer (12).

22 Claims, 1 Drawing Sheet

(51) Int. Cl.
C05B 11/08 (2006.01)
C05B 19/00 (2006.01)
C01B 25/28 (2006.01)

(56) References Cited

U.S. PATENT DOCUMENTS

| | | | |
|---|---|---|---|
| 4,378,340 A | 3/1983 | Berglund | |
| 4,604,126 A | 8/1986 | Moraillon | |
| 4,986,970 A | 1/1991 | Haraldsen | |
| 5,431,895 A | 7/1995 | Vermaire et al. | |
| 6,117,406 A * | 9/2000 | Vogel | B01J 19/2415 |
| | | | 423/310 |
| 2016/0060113 A1 * | 3/2016 | Cohen | C01G 45/02 |
| | | | 423/122 |
| 2016/0297719 A1 | 10/2016 | Takhim | |

FOREIGN PATENT DOCUMENTS

| | | |
|---|---|---|
| EP | 0040122 A1 | 11/1981 |
| EP | 0638516 A1 | 2/1995 |
| FR | 2257542 A1 | 8/1975 |
| FR | 2284559 A1 | 4/1976 |
| MA | 18993 A1 | 7/1981 |
| WO | 8002418 A1 | 11/1980 |
| WO | 2015082468 A1 | 6/2015 |

OTHER PUBLICATIONS

International Search Report from PCT/MA2016/000012 dated Feb. 1, 2017, pp. 1-17.

* cited by examiner

METHOD FOR MANUFACTURING AN AMMONIUM PHOSPHATE FERTILIZER HAVING LOW CADMIUM CONTENT

CROSS REFERENCE TO RELATED APPLICATIONS

The present application is a national phase entry under 35 U.S.C. § 371 of International Application No. PCT/MA2016/000012 filed Aug. 3, 2016, published in French, which claims priority from French Patent Application No. 1557483 filed Aug. 3, 2015, all of which are incorporated herein by reference.

FIELD OF THE INVENTION

The present invention relates to a method for manufacturing an ammonium phosphate fertilizer having low cadmium content.

BACKGROUND OF THE INVENTION

Phosphate ores constitute the main source of phosphorous used in the fertilization of soils and the improvement of agricultural yields. The transformation of the rock into fertilizer involves the manufacture of phosphoric acid, which is done almost exclusively by wet process via the acid lixiviation of the ores, the latter gives acids which after transformation give fertilizers containing the major part of the impurities, of which cadmium. The quality of ores changes and cadmium, an element of which the contents in fertilizers are restricted in several countries, may be present in phosphate ores at high levels.

Different decadmiation processes of phosphates and derivatives thereof have been explored up to present. Some intervene upstream of the chemical upgrading of the ore while treating the phosphate-bearing rock; others treat the phosphoric acid obtained by wet phosphate ore treatment. Methods for decadmiation of the ore involve calcination at high temperature: they are thus particularly energy consuming. As for decadmiation methods after attack of the ore, different basic principles have been explored, among which:

decadmiation by co-crystallization in anhydrous calcium sulfate. The distribution of cadmium between the phosphoric acid and the calcium sulfate precipitate shows that the proportion of cadmium in the anhydrite may be one hundred times that observed for the dihydrate. This property makes it possible to reduce the cadmium of the phosphoric medium by means of recrystallization. This principle is however limited when high cadmium contents have to be reduced.

decadmiation by liquid-liquid extraction. However, the extraction methods have not shown themselves to be very suited technically and economically for the treatment of the large quantities of solutions implemented in fertilizer manufacturing methods. This is due in particular to the high cost of the solvents and to the technical problems encountered, linked notably to the formation of emulsions.

decadmiation by ion exchange resins. In this context, two mechanisms may be envisaged: (i) cationic exchange, which necessitates, in the case of cadmium, large size towers for reasons of cadmium affinity; large volumes of regeneration solution are also produced and necessitate adequate treatment; (ii) anionic exchange, which necessitates the use of halide sources (notably bromides or iodides) so as to form halide/cadmium ions with high affinity towards the resins used.

chemical precipitation of cadmium.

Among methods based on chemical precipitation of cadmium may be cited the method that is the subject matter of the U.S. Pat. No. 4,986,970, which uses the metal salts of dithio carbonic acid-O-esters as precipitation agents. These precipitation agents are costly organosulfur products, such that this method is not very attractive from an economic viewpoint.

Another method of decadmiation of phosphoric acid, which is based on precipitation by sulfides, is that proposed in the U.S. Pat. No. 4,378,340, which proposes pre-neutralizing the phosphoric acid upstream of the precipitation by sulfides ($Na_2S$) using ammonium hydroxide, potassium hydroxide or sodium hydroxide as base. This method gives decadmiated acids that are incompatible with the conventional mode of production of MAP (Mono-Ammonium-Phosphate) and DAP (Di-Ammonium-Phosphate) fertilizers. Indeed, they can lead either to a significant dilution in the case of an ammonium hydroxide solution (a saturated solution contains the equivalent of 0.308 kg of ammonia/l) or to a modification of the medium through the introduction of other elements in the case of potassium hydroxide or sodium hydroxide, which prevents compliant MAP and DAP fertilizers from being obtained.

To the knowledge of the inventors, none of the existing decadmiation methods is implemented during processes for manufacturing ammonium phosphate fertilizers.

Ammonium phosphate fertilizers are manufactured by reaction between phosphoric acid and ammonia so as to form either mono-ammonium phosphate (MAP) or di-ammonium phosphate (DAP) according to the reactions:

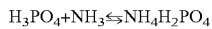

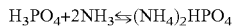

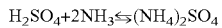

while controlling the ammonia/phosphoric acid molar ratio in the course of the neutralization process. The neutralization of phosphoric acid with ammonia is generally carried out in several steps by means of different reaction equipment: stirred vessels, tubular reactors, granulators, etc.

In a large proportion of the methods exploited at present a first step of neutralization, generally called pre-reactor, is carried out, the nitrogen/phosphorous molar ratio (N/P) of the slurry produced at this step is maintained at a value that confers a maximum of solubility to the ammonium phosphates. This molar ratio is generally adjusted between 1.4 and 1.5 in the case of DAP and between 0.6 and 0.7 in the case of MAP. The slurry thereby obtained may be introduced either into an additional reactor generally of tubular type to undergo therein a penultimate ammoniation before being sprayed, in the granulator-ammoniator, onto a bed of recycled product onto which ammonia is also sprayed, or instead introduced directly into the granulator-ammoniator from the pre-reactor without intermediate ammoniation.

The granulation step thus constitutes the final step of ammoniation accompanying the shaping into granules by the agitation movement of the bed, brought about by the rotation of the granulating equipment. This step also makes it possible to remove part of the humidity of the product formed, but an additional step of drying in a dedicated item of equipment is in general required. After drying, the product goes through a particle size classification, a step which also generates the circulating load recycled to the granulator, the product with compliant particle size is next cooled and treated by a coating that makes it possible to improve its physical quality with respect to the generation of dust and/or caking.

With this process for manufacturing phosphate fertilizers, all the initial cadmium of the phosphoric acid is found again in the fertilizers produced.

BRIEF DESCRIPTION OF THE INVENTION

One aim of the invention is to overcome the aforesaid drawbacks and to propose a method for manufacturing an ammonium phosphate fertilizer having low cadmium content which can be implemented at an industrial scale and which does not place a burden on the cost of said fertilizer.

In accordance with the invention, a method is proposed for manufacturing an ammonium phosphate fertilizer from a phosphoric acid aqueous solution that has less than 50% $P_2O_5$ concentration and is obtained by wet phosphate ore treatment, said phosphoric acid containing traces of cadmium, comprising the following steps:

(a) neutralizing said phosphoric acid solution with ammonia up to a molar ratio N/P of between 0.1 and 0.8, (b) reacting said partially neutralized solution with a sulfide source so as to form a cadmium sulfide precipitate (9), (c) separating said precipitate so as to obtain a refined ammoniated phosphoric acid solution, (d) ammoniating and granulating said refined solution so as to form said fertilizer.

According to one embodiment, before the ammoniating-granulating step, a complementary ammoniation of the refined solution is implemented so as to obtain a molar ratio N/P determined to obtain a NP or NPK type fertilizer.

Advantageously, the concentration of the phosphoric acid solution is between 20 and 50% $P_2O_5$, preferentially between 25 and 45% $P_2O_5$.

According to a preferred embodiment, the molar ratio N/P during step (b) of precipitation of cadmium sulfide is between 0.2 and 0.6, preferentially between 0.3 and 0.5.

Advantageously, the sulfide source is used in excess with respect to the quantity of cadmium present in the phosphoric acid solution.

The sulfide source introduced generally implements between 3 and 15 kg equivalent solid NaHS per ton of $P_2O_5$.

According to one embodiment, the sulfide source is an aqueous NaHS solution or any other sulfide source that has sufficient solubility in phosphoric acid to reach the stoichiometric ratio necessary for decadmiation.

According to one embodiment, the step (b) of reaction with the sulfide source is carried out in a pressurized stirred reactor.

Alternatively, the step (b) of reaction with the sulfide source is carried out in a pressurized tubular reactor.

The step (a) of partial neutralization with ammonia and the step (b) of reaction with the sulfide source may be implemented separately or simultaneously.

According to one embodiment, the method comprises, between the step (c) of separating and the step (d) of granulating, a step of concentrating the refined solution.

Another object of the invention relates to a fertilizer capable of being obtained by the method as described above and characterized in that it has a cadmium content less than 40 mg/kg $P_2O_5$.

BRIEF DESCRIPTION OF THE DRAWINGS

Other characteristics and advantages of the invention will become clear from the detailed description that follows, with reference to the appended drawings, in which.

DETAILED DESCRIPTION OF THE INVENTION

The decadmiation method implemented in the present invention is based on a precipitation of cadmium in the form of sulfides during the method for manufacturing ammonium phosphate fertilizers.

Sulfides, like carbonates, oxides and hydroxides, are water insoluble salts. Like cadmium, other trace metal elements also give precipitates $M_nS_m$ (M being the symbol of the metal in question, n and m represent the stoichiometric proportions of said metal and sulfur in the precipitate) of very low solubility. Precipitation is, however, greatly affected by the acidity of the medium.

The method according to the invention is based on a readjustment of the steps of reaction between ammonia and phosphoric acid necessary for the manufacture of ammonium phosphate fertilizers, by integrating therein, when the reaction medium favors it, a step of precipitation of cadmium in the form of cadmium sulfide.

The main steps of the method for manufacturing are:

a first step of reaction between phosphoric acid and ammonia. The partial neutralization is conducted up to a molar ratio N/P so as to avoid the formation of ammonium phosphates in the operating conditions of the method. Depending on the $P_2O_5$ concentration of the phosphoric acid solution, which can reach up to 50% $P_2O_5$, a molar ratio N/P of between 0.1 and 0.8 may be used.

adding an inorganic sulfide source, such as a NaHS solution for example, leading to the formation of a cadmium sulfide precipitate.

separating said precipitate vis-à-vis the ammoniated acid, by a separating technique known per se, so as to obtain a refined ammoniated phosphoric acid solution.

optionally, concentrating said refined solution, if need be, the implementation of a complementary ammoniation of the refined solution (optionally concentrated) to obtain the desired molar ratio N/P for the fertilizer, granulating the ammoniated acid so as to form the fertilizer.

Figure 1:
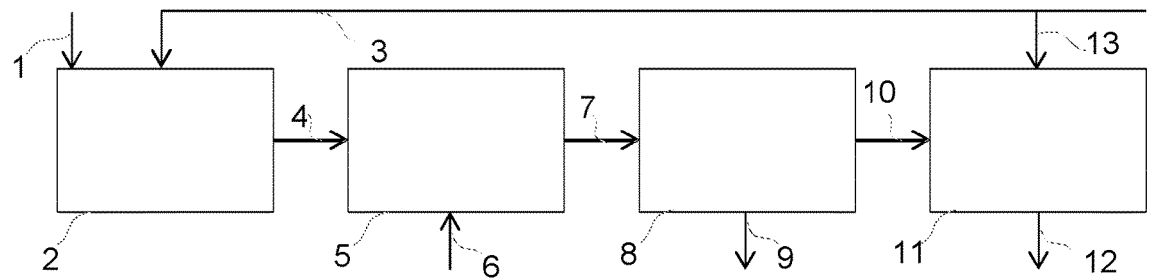
FIG. 1 is a block diagram of the method for manufacturing fertilizer according to one embodiment of the invention.

FIG. 1 illustrates an embodiment of said method.

The starting product is a phosphoric acid aqueous solution 1, containing up to 50% $P_2O_5$, preferably between 20 and 50% $P_2O_5$, and in an even more preferred manner between 25 and 45% $P_2O_5$. Said solution has a cadmium content which can exceed 150 mg/kg $P_2O_5$.

Said solution 1 is introduced into a gas-liquid reactor 2 into which gaseous ammonia 3 is also introduced. The reactor 2 may be of the stirred vessel or tubular reactor type. The nitrogen/phosphorous molar ratio of the ammoniated acid 4 formed in the reactor 2 is between 0.1 and 0.8, preferably between 0.2 and 0.6, and in an even more preferred manner, between 0.3 and 0.5.

The ammoniated acid 4 is next made to react with a sulfide source 6 such as an aqueous NaHS solution or $Na_2S$ in a reactor 5 in order to obtain a solution 7 containing a cadmium sulfide precipitate. Generally speaking, the sulfide source may be any sulfide source that has sufficient solubility in phosphoric acid to reach the stoichiometric ratio necessary for decadmiation. The reactor 5 may be of the pressurized stirred vessel or tubular reactor type. Since they involve rapid reactions, the steps of pre-neutralization and precipitation may be carried out simultaneously, reactors 2 and 5 then being merged.

In a particularly advantageous manner, the sulfide source 5 is used in excess with respect to the quantity of cadmium present in the phosphoric acid, in order to ensure precipitation of practically all the cadmium present. Given the cadmium contents normally encountered in phosphoric acid, the quantity of solid NaHS is preferentially between 3 and 15 kg per ton of $P_2O_5$.

The precipitate 9 is separated in a separation device 8 by a known separating technique, such as filtration, decantation or centrifugation.

The refined solution 10 obtained at the end of the separation step next undergoes a complementary ammoniation in one or more steps, during granulation in a granulator 11 and/or before, with ammonia in the gaseous and/or compressed liquid state 13 in order to reach the desired molar ratio N/P for the fertilizer 12.

The granulation in the granulator 11 may be carried out in the presence of different materials: recycled fertilizer (circulating load), sources of nutritional elements and trace elements, ballast, additives, etc. according to the methods in force.

The granulated fertilizer 12 may be a binary (of type: MAP, DAP, etc.) or ternary (NPK) fertilizer if a potassium source is used during the manufacture, said source being added during granulation.

Figure 2:
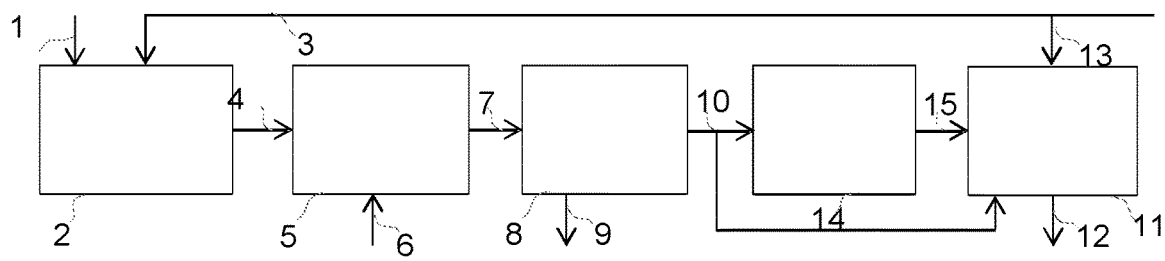
FIG. 2 is a block diagram of the method for manufacturing fertilizer according to another embodiment.

FIG. 2 illustrates an alternative embodiment of the invention. Elements that are identical to those of FIG. 1 are designated by the same reference signs and are thus not described again.

This alternative comprises, after the separation step implemented in the device 8, a concentration of the refined solution 10 by evaporation in an evaporation device 14.

It is thus possible to implement the prior steps with low $P_2O_5$ concentrations, (that is to say typically less than 30%), which are more favorable to the precipitation of cadmium sulfides. The granulating and, optionally, the complementary ammoniating, may be implemented with the refined solution 10 and the concentrated solution 15.

Whatever the embodiment implemented, the fertilizer obtained has a cadmium content less than 40 mg/kg $P_2O_5$.

Example 1

The starting product is a phosphoric acid aqueous solution containing 42% $P_2O_5$ and containing 61 ppm of cadmium (i.e. 145.2 mg Cd/kg $P_2O_5$), manufactured by wet process by sulfuric attack of phosphate ore.

An ammoniation of said solution is implemented up to a molar ratio N/P=0.4 in a first reactor.

The ammoniated acid is next introduced continuously at a rate of 110 g/min with 1.53 g/min of a 30% by weight NaHS solution prepared from solid NaHS of 70% purity (containing around 30% of crystallization water), in a second reactor, of tubular type.

The residence time in said reactor is 3 minutes and the reaction temperature is 80° C.

The reaction product is filtered so as to remove the cadmium sulfide precipitate, then the solution thereby refined is ammoniated to reach a N/P ratio of 1.85 and granulated in DAP form.

The fertilizer obtained is characterized by a cadmium content of 19.2 mg Cd/kg $P_2O_5$.

Example 2

The objective of this second example is to show the effect of the $P_2O_5$ concentration of the starting phosphoric acid on the cadmium content reduction performances, by comparing the test of example 1 with two other tests carried out according to the same protocol as in example 1 but with different concentrations of phosphoric acid.

Table 1 summarizes the test conditions and the performances obtained:

TABLE 1

|  | $P_2O_5$ content of the phosphoric acid (%) | | |
| --- | --- | --- | --- |
|  | 29 | 38 | 42 |
| Average cadmium content (ppm) in the starting product (phosphoric acid) | 45.7 | 55.9 | 61.0 |
| Cd/$P_2O_5$ ratio (mg/kg) in the starting product | 152.3 | 147.0 | 145.2 |
| Ammoniating molar ratio (N/P) | 0.4 | 0.4 | 0.4 |
| Residence time in the reactor of the pre-ammoniated acid/NaHS mixture (min) | 3 | 3 | 3 |
| Input flow rate of the ammoniated phosphoric acid (g/min) | 95.95 | 102.52 | 109.39 |
| Input flow rate by weight of the NaHS solution (g/min) | 0.87 | 1.30 | 1.53 |
| Cadmium content (mg Cd/kg $P_2O_5$) in the final product (fertilizer) | 6.4 | 128 | 19.2 |
| Cadmium removal yield (%) | 95.8 | 91.3 | 86.8 |

The results presented in table 1 show that, for a same N/P ratio at the end of the pre-neutralization step, the cadmium removal yield is better with reduced $P_2O_5$ concentration.

Example 3

The aim of example 3 is to study the effect of the molar ratio N/P of the ammoniated acid during the precipitation of cadmium sulfides on the decadmiation performances of the fertilizer.

To this end, tests carried out with a concentration of the starting phosphoric acid of 29% $P_2O_5$ and partial neutralization molar ratios N/P respectively of 0.2, 0.4 and 0.6 are compared.

Table 2 summarizes the test conditions and the performances obtained:

TABLE 2

|  | $P_2O_5$ content of the phosphoric acid (%) | | |
| --- | --- | --- | --- |
|  | 29 | 29 | 29 |
| Average cadmium content (ppm) in the starting product (phosphoric acid) | 45.7 | 45.7 | 45.7 |
| Cd/$P_2O_5$ ratio (mg/kg) in the starting product | 152.3 | 152.3 | 152.3 |
| Ammoniating molar ratio (N/P) | 0.2 | 0.4 | 0.6 |
| Residence time in the reactor of the pre-ammoniated acid/NaHS mixture (min) | 3 | 3 | 3 |
| Input flow rate of the ammoniated phosphoric acid (g/min) | 95.95 | 95.95 | 95.95 |
| Input flow rate by weight of the NaHS solution (g/min) | 0.87 | 0.87 | 0.87 |

TABLE 2-continued

|  | $P_2O_5$ content of the phosphoric acid (%) | | |
| --- | --- | --- | --- |
|  | 29 | 29 | 29 |
| Cadmium content (mg Cd/kg $P_2O_5$) in the final product (fertilizer) | 21.2 | 6.4 | 24 |
| Cadmium removal yield (%) | 86.1 | 95.8 | 98.4 |

The results presented in table 2 show that, for a same concentration of starting phosphoric acid, the cadmium removal yield is better with a high ammoniating molar ratio (N/P).

Example 4

This example takes advantage of the good performances of the decadmiation by the method using a diluted phosphoric acid solution, here with a concentration of 27% $P_2O_5$, and implementing a later concentration, according to the synoptic of FIG. 2.

Table 3 presents the test conditions and the performances obtained with two ammoniating molar ratios (respectively 0.2 and 0.4):

TABLE 3

|  | Ref. of the example | |
| --- | --- | --- |
|  | 4.1 | 4.2 |
| $P_2O_5$ content (%) of the phosphoric acid | 27 | |
| Average cadmium content (ppm) in the starting product (phosphoric acid) | 41.2 | |
| Cd/$P_2O_5$ ratio (mg/kg) in the starting product | 152 | |
| Ammoniating molar ratio (N/P) | 0.2 | 0.4 |
| Residence time in the reactor of the pre-ammoniated acid/NaHS mixture (min) | 3 | 3 |
| Flow rate of ammoniated phosphoric acid (g/min) | 96 | 96 |
| Flow rate by weight of NaHS solution (g/min) | 0.87 | 0.87 |
| Average Cd content at the output (ppm) | 5.1 | <l.d. |
| Cadmium content (mg Cd/kg $P_2O_5$) of the refined solution before the concentration step | 18.9 | — |

As seen in example 3, the decadmiation performance is better with the highest molar ratio N/P.

The two pre-ammoniated acids, treated by NaHS and refined, were then concentrated under a vacuum of 0.2 bar.

Table 4 presents the test conditions and the performances obtained with the two refined solutions:

TABLE 4

|  |  | Ref. of the example | |
| --- | --- | --- | --- |
|  |  | 4.1 | 4.2 |
| Pre-ammoniated phosphoric acid, treated by NaHS and concentrated | $P_2O_5$(%) | 51.70 | 48.80 |
|  | Average Cd content (ppm) | 9.7 | 1.0 |
| Cadmium content (mg Cd/kg $P_2O_5$) in the final product (fertilizer) |  | 18.80 | 211 |
| Cadmium removal yield (%) |  | 85.2 | 98.6 |

REFERENCES

U.S. Pat. No. 4,986,970
U.S. Pat. No. 4,378,340

The invention claimed is:

1. A method for manufacturing an ammonium phosphate fertilizer from a phosphoric acid aqueous solution that has from 25 to 45% $P_2O_5$ concentration and is obtained by wet phosphate ore treatment by sulfuric acid, said phosphoric acid containing traces of cadmium, comprising the following steps:
   (a) neutralizing said phosphoric acid solution with gaseous ammonia up to a molar ratio N/P of between 0.1 and 0.8,
   (b) reacting said partially neutralized solution with a sulfide source so as to form a cadmium sulfide precipitate,
   (c) separating said precipitate so as to obtain a refined ammoniated phosphoric acid solution,
   (d) concentrating the refined ammoniated phosphoric acid solution,
   (e) ammoniating and granulating said concentrated refined ammoniated phosphoric acid solution so as to form said fertilizer,
   all steps (a) to (e) being carried out in an ammonium phosphate fertilizer manufacturing line.

2. The method of claim 1, wherein before the ammoniating-granulating step a complementary ammoniation of the refined solution is implemented so as to obtain a molar ratio N/P determined to obtain a NP or NPK type fertilizer.

3. The method of claim 1, wherein a molar ratio N/P during the step (b) of precipitation of cadmium sulfide is between 0.2 and 0.6.

4. The method of claim 1, wherein the sulfide source is used in excess with respect to the quantity of cadmium present in the phosphoric acid solution.

5. The method of claim 1, wherein the sulfide source introduced implements between 3 and 15 kg equivalent solid NaHS per ton of $P_2O_5$.

6. The method of claim 1, wherein the sulfide source is an aqueous NaHS solution or any other sulfide source having sufficient solubility in phosphoric acid to reach the stoichiometric ratio necessary for decadmiation.

7. The method of claim 1, wherein the step (b) of reaction with the sulfide source is carried out in a pressurized stirred reactor.

8. The method of claim 1, wherein the step (b) of reaction with the sulfide source is carried out in a pressurized tubular reactor.

9. The method of claim 1, wherein the step (a) of partial neutralization with ammonia and the step (b) of reaction with the sulfide source are implemented separately.

10. The method of claim 1, wherein the step (a) of partial neutralization with ammonia and the step (b) of reaction with the sulfide source are implemented simultaneously.

11. The method of claim 1, wherein a molar ratio N/P during the step (b) of precipitation of cadmium sulfide is between 0.3 and 0.5.

12. A method for manufacturing an ammonium phosphate fertilizer from a phosphoric acid aqueous solution that has from 25 to 45% $P_2O_5$ concentration and is obtained by wet phosphate ore treatment by sulfuric acid, said phosphoric acid containing traces of cadmium, comprising the following steps:
   (a) neutralizing said phosphoric acid solution with ammonia up to a molar ratio N/P of between 0.1 and 0.8, (b) reacting said partially neutralized solution with a sulfide source so as to form a cadmium sulfide precipitate,
(c) separating said precipitate so as to obtain a refined ammoniated phosphoric acid solution,
(d) ammoniating and granulating said refined ammoniated phosphoric acid solution so as to form said fertilizer,
all steps (a) to (d) being carried out in an ammonium phosphate fertilizer manufacturing line.

13. The method of claim 12, wherein a molar ratio N/P during the step (b) of precipitation of cadmium sulfide is between 0.2 and 0.6.

14. The method of claim 12, wherein the sulfide source is used in excess with respect to the quantity of cadmium present in the phosphoric acid solution.

15. The method of claim 12, wherein the sulfide source introduced implements between 3 and 15 kg equivalent solid NaHS per ton of $P_2O_5$.

16. The method of claim 12, wherein the sulfide source is an aqueous NaHS solution or any other sulfide source having sufficient solubility in phosphoric acid to reach the stoichiometric ratio necessary for decadmiation.

17. The method of claim 12, wherein the step (b) of reaction with the sulfide source is carried out in a pressurized stirred reactor.

18. The method of claim 12, wherein the step (b) of reaction with the sulfide source is carried out in a pressurized tubular reactor.

19. The method of claim 12, wherein the step (a) of partial neutralization with ammonia and the step (b) of reaction with the sulfide source are implemented separately.

20. The method of claim 12, wherein the step (a) of partial neutralization with ammonia and the step (b) of reaction with the sulfide source are implemented simultaneously.

21. The method of claim 12, wherein the ammonium phosphate fertilizer is selected from the group consisting of MAP (Mono-Ammonium-Phosphate) and DAP (Di-Ammonium-Phosphate) fertilizers.

22. The method of claim 12, wherein a molar ratio N/P during the step (b) of precipitation of cadmium sulfide is between 0.3 and 0.5.

\* \* \* \* \*